G. STALEY.
Griddle.

No. 212,759.  Patented Feb. 25, 1879.

Witnesses  Inventor

UNITED STATES PATENT OFFICE.

GEORGE STALEY, OF PARNASSUS, PENNSYLVANIA.

IMPROVEMENT IN GRIDDLES.

Specification forming part of Letters Patent No. 212,759, dated February 25, 1879; application filed February 20, 1878.

*To all whom it may concern:*

Be it known that I, GEORGE STALEY, of Parnassus, Westmoreland county, Pennsylvania, have invented a new and useful Improvement in Griddles, which improvement is fully set forth in the following specification, reference being had to the accompanying drawings.

Similar letters of reference indicate corresponding parts.

My invention consists of a griddle for baking pan-cakes, provided with a central pivotal coned projection on the under side thereof, which coned projection is made to register with a like concaved indent upon a pot-hole cover, forming a pivotal center, upon which it may be revolved at will, and lifted from the stove-top when desired, thus changing the position of the griddle with reference to the heated parts of the stove-top; and it may also be placed in such position that while one part of the griddle will remain on the stove-top, another part thereof will project over the outer edge of the same, by which means the different parts of the griddle may be heated or cooled, as desired, and the heat equalized throughout the whole area of the griddle, and thus bake alike on all parts of the same. The griddle is also slightly elevated by the pivot from the stove-top, forming an air-space between the stove-top and the griddle, which serves also to equalize the heat of the griddle.

Figure 1:
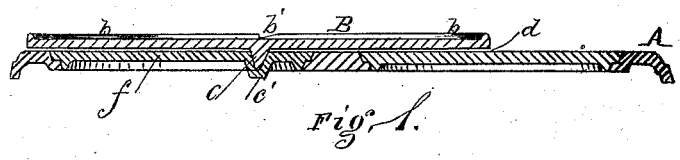
Figure 2:
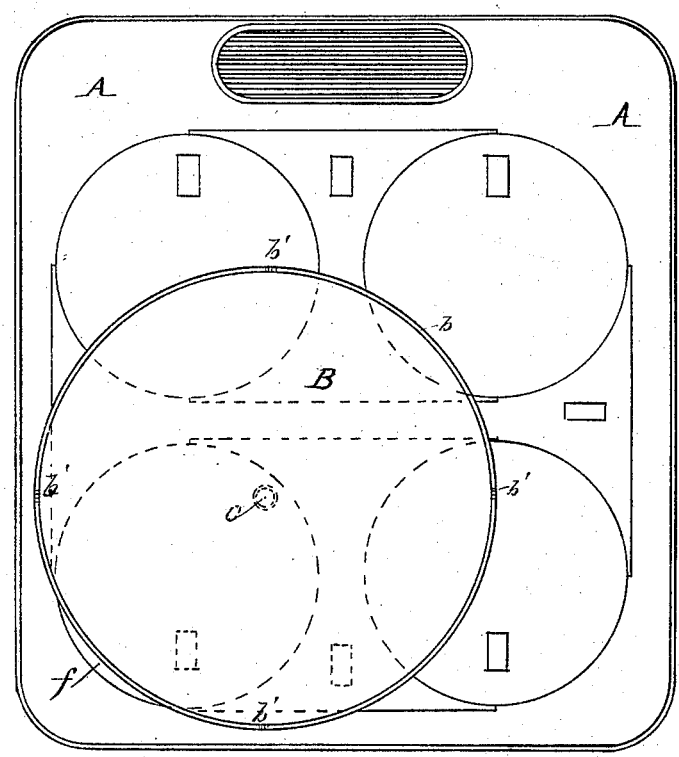

In the accompanying drawings, Figure 1 represents a vertical central section of a stove-top and griddle in place, and Fig. 2 shows a top view of the same.

The griddle B is made of circular form. A slight flange, $b$, is formed around the periphery of the griddle, projecting upward from the top surface of the same. Notches $b'$ are made in the top edge of the flange $b$, which serve as a hold for rotating the griddle, with the cake-turner or other suitable instrument secured rigidly to the under side of the griddle, and at the center thereof is a pivotal projection, $c$, which is made to register with the depression $c'$ in the top of the lid $f$.

The pivotal projection $c$ is made of suitable length to allow the griddle to rest thereon, and thus elevate it above the stove-top, forming an air-space, $d$, between the stove-top and the griddle.

It will be seen that by placing the lid $f$ of the stove-top with the depression $c'$ toward the outer edge of the stove-top, a part of the griddle will be made to project over the edge, while the other part of the same will remain on the stove-top, and by rotating the griddle a part thereof will be cooled or heated, as desired.

I do not claim rotating shelves or vessels adapted to stove-tops, broadly; but,

Having thus described my invention, what I claim as new, and desire to secure by Letters Patent, is—

The combination of a pot-hole cover provided with a pit or depression, as shown, and a rotary griddle having a pivotal projection to fit the depression, and provided with notches $b'$, substantially as described.

In testimony that I claim the foregoing as my invention I have, at Pittsburg, Pennsylvania, set my hand to this paper in the presence of two witnesses.

GEO. STALEY.

Witnesses:
JAMES HOLLIDAY,
H. B. BLACKSTONE.